(12) United States Patent
Babb et al.

(10) Patent No.: US 9,341,384 B2
(45) Date of Patent: May 17, 2016

(54) ENDOTHERMIC BASE-MOUNTED HEAT PUMP WATER HEATER

(71) Applicant: Rheem Manufacturing Company, Atlanta, GA (US)

(72) Inventors: Jeremy Lee Babb, Fort Smith, AR (US); Paul D. McKim, Fort Smith, AR (US)

(73) Assignee: RHEEM MANUFACTURING COMPANY, Atlanta, GA (US)

( * ) Notice: Subject to any disclaimer, the term of this patent is extended or adjusted under 35 U.S.C. 154(b) by 0 days.

(21) Appl. No.: 14/754,061

(22) Filed: Jun. 29, 2015

(65) Prior Publication Data

US 2015/0300658 A1 Oct. 22, 2015

Related U.S. Application Data

(63) Continuation of application No. 13/787,914, filed on Mar. 7, 2013, now Pat. No. 9,157,655.

(60) Provisional application No. 61/638,968, filed on Apr. 26, 2012.

(51) Int. Cl.
| | |
|---|---|
| F24C 1/00 | (2006.01) |
| F24C 11/00 | (2006.01) |
| F24H 1/20 | (2006.01) |
| F24D 17/00 | (2006.01) |
| F24H 4/04 | (2006.01) |
| F24H 1/00 | (2006.01) |
| F24H 9/20 | (2006.01) |

(52) U.S. Cl.
CPC .......... *F24D 17/0036* (2013.01); *F24H 1/0018* (2013.01); *F24H 1/201* (2013.01); *F24H 4/04* (2013.01); *F24H 9/2007* (2013.01); *F24H 9/2021* (2013.01)

(58) Field of Classification Search
None
See application file for complete search history.

(56) References Cited

U.S. PATENT DOCUMENTS

| | | | |
|---|---|---|---|
| 2,668,420 | A | 2/1954 | Hammell |
| 4,290,275 | A | 9/1981 | Disco et al. |
| 4,336,692 | A | 6/1982 | Ecker et al. |
| 4,363,221 | A | 12/1982 | Singh |

(Continued)

FOREIGN PATENT DOCUMENTS

| | | |
|---|---|---|
| JP | 2007232236 | 9/2007 |
| WO | WO 2009/026618 | 3/2009 |

OTHER PUBLICATIONS

Canadian Office Action issued for Canadian Application No. 2,815,500 dated Apr. 30, 2014, 2 pages.

*Primary Examiner* — Thor Campbell
(74) *Attorney, Agent, or Firm* — Haynes and Boone, LLP

(57) ABSTRACT

An endothermic heat pump water heater has a water tank supported atop a hollow base, a heat pump circuit operable to provide primary heat to water in the tank, and an electric resistance heating element operable to provide secondary heat to the water. The heat pump circuit includes refrigerant tubing in which a compressor disposed within the base, a condenser in heat exchange external contact with the tank, a refrigerant expansion device, and an evaporator disposed within the base are connected in series. A vertical duct, external to the tank, has an inlet adjacent the upper tank end, and a fan is operative to sequentially flow air inwardly through the inlet, downwardly through the duct into the base, across the compressor, across the evaporator, and then outwardly from the base.

16 Claims, 2 Drawing Sheets

(56) References Cited

U.S. PATENT DOCUMENTS

| | | |
|---|---|---|
| 4,513,585 A | 4/1985 | Maisonneuve |
| 4,727,727 A | 3/1988 | Reedy |
| 4,766,734 A | 8/1988 | Dudley |
| 5,220,807 A | 6/1993 | Bourne et al. |
| 5,946,927 A | 9/1999 | Dieckmann et al. |
| 6,233,958 B1 | 5/2001 | Mei et al. |
| 6,698,386 B1 | 3/2004 | Hoffman |
| 7,334,419 B2 | 2/2008 | Gordon et al. |
| 7,866,168 B2 | 1/2011 | Gordon et al. |
| 8,385,729 B2 | 2/2013 | Kleman et al. |
| 8,422,870 B2 | 4/2013 | Nelson et al. |
| 2006/0213210 A1 | 9/2006 | Tomlinson et al. |

ENDOTHERMIC BASE-MOUNTED HEAT PUMP WATER HEATER

CROSS-REFERENCE TO RELATED APPLICATION

The present application is a continuation patent application of U.S. patent application Ser. No. 13/787,914, filed on Mar. 7, 2013 which claims the benefit of the filing date of provisional U.S. Patent Application No. 61/638,968 filed Apr. 26, 2012, and the disclosures of both applications are hereby incorporated by reference in their entirety.

BACKGROUND OF THE INVENTION

The present invention generally relates to water heaters and, in a representatively illustrated embodiment thereof, more particularly provides a specially designed endothermic heat pump water heater.

Water heaters incorporating, as a heat source, a heat pump circuit in addition to a fuel-fired or electric resistance type water heating system are known in the water heating art. While the heat pump circuit, due to its high thermal efficiency, has typically been viewed as a useful addition to conventional water heating apparatus such as electrical resistance heating elements, it has been seen as desirable design goal to improve in water heating applications various characteristics of conventionally constructed heat pump circuits. Such desired improvements include increasing the reliability and thermal efficiency of such heat pump circuits, reducing their noise generation, and reducing undesirable heat transfer from the water heater tank to cooled air flow created by operation of the heat pump circuit. It is to this design goal that the present invention is primarily directed.

DETAILED DESCRIPTION

Figure 1:
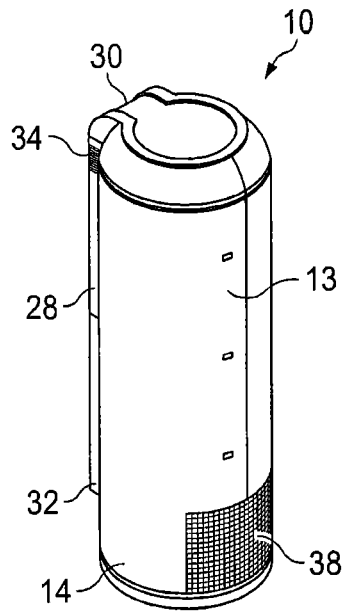
FIG. 1 is a perspective view of the water heater.
Figure 2:
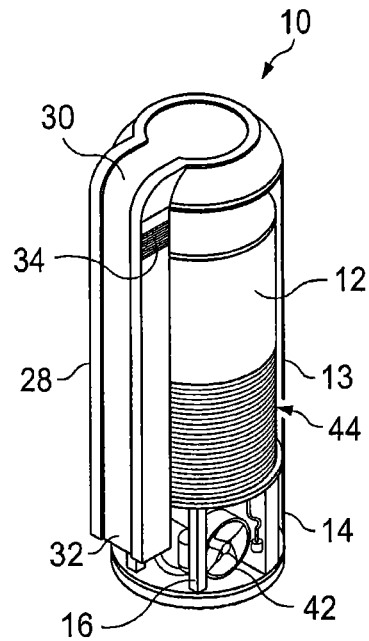
FIG. 2 is a partially cut away perspective view of the water heater.
Figure 4:
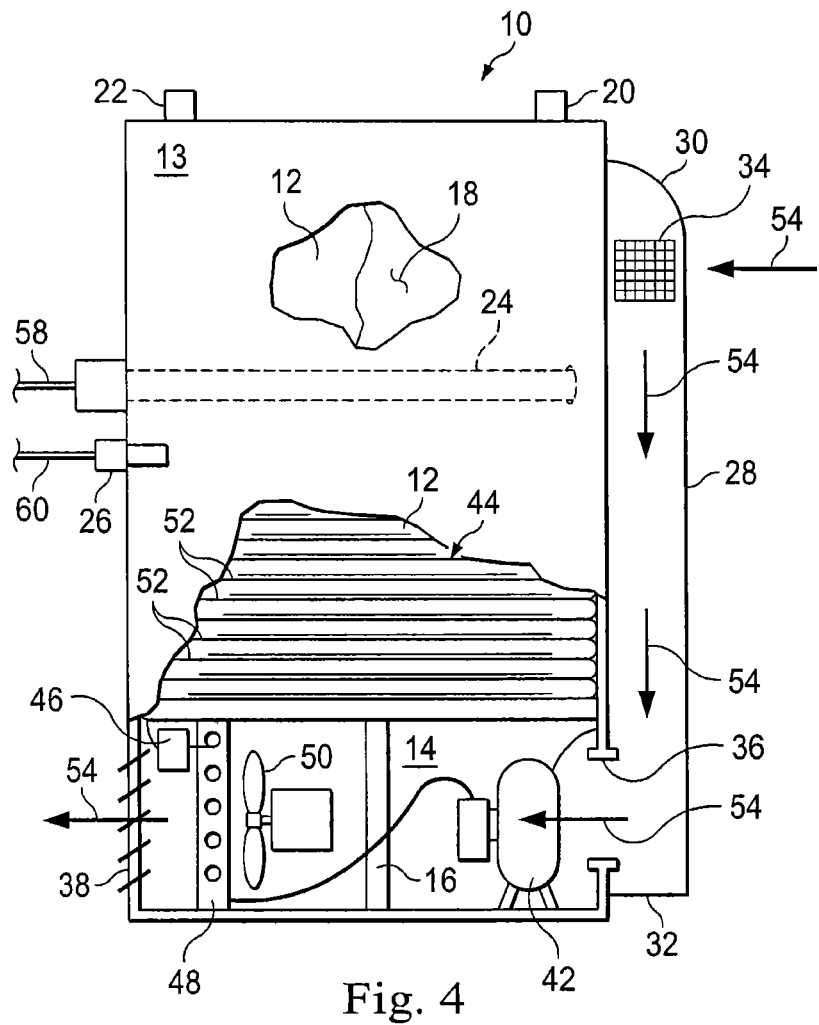
FIG. 4 is an enlarged scale, partially cut away schematic side elevational view of the water heater.

With reference initially to FIGS. 1, 2 and 4, the present invention provides a specially designed endothermic base-mounted heat pump water heater 10 having a vertically elongated cylindrical metal tank 12 enclosed within an insulated metal jacket structure 13 and mounted atop a hollow cylindrical base 14 having a circumferentially spaced plurality of support members 16 spaced around its periphery. A quantity of pressurized water 18 to be heated is stored within the interior of the tank 12 for on-demand delivery to a variety of hot water-utilizing plumbing fixtures such as sinks, tubs, dishwashers, showers and the like, via a hot water outlet 20 from the upper end of the tank 12 (see FIG. 4) or a hot water outlet (not shown) from an upper side portion of the tank 12. Hot water withdrawn from the tank in this manner is automatically replaced by pressurized cold water received from a suitable source, such as a municipal water supply, via a cold water inlet 22 on the upper end of the tank 12 (see FIG. 4) or a cold water inlet (not shown) at a bottom side portion of the tank 12.

In addition to a subsequently described specially designed heat pump-based primary water heating source, to heat the water 18 the water heater 10 is provided with a secondary source of heat—illustratively electric heat—via one or more immersion type electric heating elements 24 extending as shown through the interior of the tank 12. Alternatively, the secondary heating source could be a fuel-fired source or another type of non-heat pump based secondary water heating source. A suitable temperature sensor, such as a thermostat 26, is utilized to control the heating element 24.

For purposes later described herein, a vertically elongated duct 28 extends externally along the tank jacket 13 and has a closed upper end 30 adjacent the upper end of the water heater 10, and a closed lower end 32 adjacent the bottom end of the water heater 10. Air intake grilles 34 are positioned on opposite sides of the upper duct end 30, an outlet opening 36 in the lower duct end 32 communicates with the interior of the base 14, and an air outlet grille 38 is disposed in a side wall portion of the base 14 opposite the duct opening 36.

Figure 3:
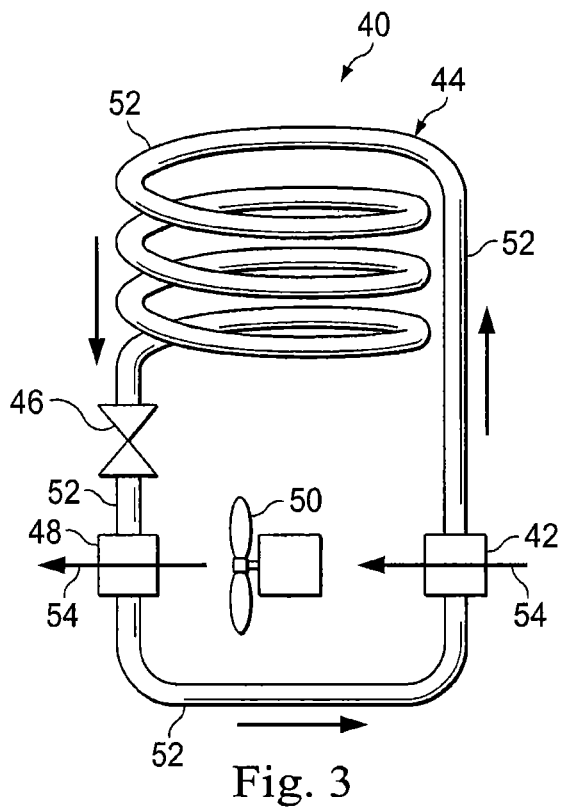
FIG. 3 is a schematic circuit diagram of a heat pump circuit portion of the water heater.

Turning now to FIG. 3, a refrigerant-based heat pump circuit 40 is uniquely incorporated into the water heater 10 to provide it with an energy efficient primary source of water heating. Circuit 40 includes a compressor 42, a condenser coil 44, a refrigerant expansion device 46 (representatively in the form of an expansion valve) and a flat panel evaporator coil 48 with an associated motor-driven evaporator fan 50, connected in series as shown in refrigerant tubing 52. During operation of the circuit 40, refrigerant flows through the tubing 52 in the direction indicated by the tubing flow arrows in FIG. 3.

Returning to the FIG. 4 schematic view of the water heater 10, the compressor 42 is disposed within the hollow base 14 inwardly adjacent the duct outlet opening 36, and the expansion device 46 and evaporator coil 48 are positioned inwardly of the base outlet grille 38 across from the compressor 42. As illustrated, the condenser coil 44 is defined by tubing 52 wrapped around and contacting the tank 12, illustratively a lower end portion thereof, underneath the jacket structure 13.

During operation of the heat pump circuit 40, the evaporator fan 50 sequentially draws ambient air 54 adjacent the water heater 10 sequentially into the air intake grilles 34, downwardly through the external duct 28, into the interior of the base 14 through the duct outlet opening 36, and across the compressor 42 to cool it. The evaporator fan 50 then sequentially forces the air 54 across the evaporator coil 48 and outwardly through the outlet grille 38 at the bottom of the water heater 10. Another suitable type of fan could be utilized to move the air 54 from the top of the water heater 10 through the interior of the base 14 if desired. Refrigerant heat from the condenser coil 44 is transferred to the tank water 18 through the tank 12, and the air 54 is cooled by the evaporator coil 48 before being flowed out of the interior of the base 14 through the grille 38. Heat transfer from the condenser coil 44 to the tank 12 may be enhanced by suitably flattening the portion of the tubing 52 forming the coil 44 and/or utilizing a suitable thermal paste between the coil 44 and the tank 12.

Figure 5:
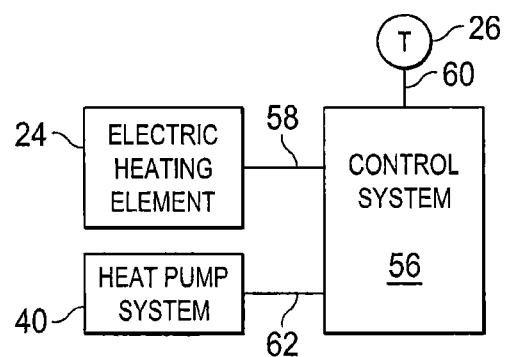
FIG. 5 is a schematic block diagram of a representative control system for the water heater.

Operation of the electric heating element 24 (see FIG. 4) and the heat pump system 40 (see FIG. 3) is regulated as a function of the tank water temperature, as illustratively sensed by the thermostat 26, by a schematically depicted control system 56 shown in FIG. 5. Control system 56 is respectively connected to the electric heating element 24, the thermostat 26 and the heat pump system 40 by control leads 58, 60 and 62. The control system 56, which forms no part of the present invention, automatically energizes the heating element 24 and/or the heat pump system 40, in a suitable manner as needed to maintain the tank water 18 at a predetermined temperature.

The unique design of the water heater 10 provides a variety of advantages over conventionally configured heat pump-enhanced water heaters. For example, since the condenser coil 44 is disposed at a higher elevation than the compressor 42, oil return to the compressor from the condenser coil 44 is gravity-driven, thereby improving compressor reliability and heat exchange. Additionally, the elevation of the air intakes 34 to adjacent the top of the water heater 10 desirably provides the ability to remove more heat from the air 54 traversing the heat pump system compared to, for example, taking the air 54 from floor level. The evaporator fan-driven air flow through the water heater base 14 cools the compressor 42 and supplies even warmer air to the evaporator coil 48. Further, the raised tank orientation reduces undesirable heat transfer from the tank to the cooled air 54 discharged from the water heater base 14. Moreover, the noise-generating heat pump components 42,50 are isolated within the base 14, thereby reducing the operating noise of the water heater 10 when the heat pump circuit 40 is operating.

The foregoing detailed description is to be clearly understood as being given by way of illustration and example only, the spirit and scope of the present invention being limited solely by the appended claims.

What is claimed is:

1. A water heater comprising:
   a hollow base;
   a tank adapted to hold a quantity of water to be heated, said tank having upper and lower ends and being supported atop said base;
   a heat pump circuit operable to provide primary heat to water in said tank, said heat pump circuit comprising refrigerant tubing in which (1) a compressor disposed within said base, (2) a condenser in heat exchange contact with said tank, (3) a refrigerant expansion device, and (4) an evaporator disposed within said base are connected in series in a manner such that said compressor is operative to flow refrigerant sequentially through said condenser, said expansion device, and said evaporator and then back to said compressor via said refrigerant tubing;
   a duct positioned along an outwardly facing edge of said tank and through which air may be flowed into said base without surrounding or being surrounded by said tank;
   a fan operative to sequentially flow air through said duct into said base, across said compressor, across said evaporator, and then outwardly from said base directly to an environment external to said water heater; and
   secondary heating apparatus operable to heat water in said tank.

2. The water heater of claim 1 wherein:
   said secondary heating apparatus includes a resistance type electric heating element extending through the interior of said tank.

3. The water heater of claim 1 wherein:
   said condenser is disposed externally of said tank.

4. The water heater of claim 3 wherein:
   said condenser is a condenser coil defined by a length of said refrigerant tubing coiled externally around said tank.

5. The water heater of claim 4 wherein:
   said condenser coil extends around only a lower portion of said tank.

6. The water heater of claim 1 wherein:
   said duct has an air inlet opening disposed at an elevation substantially greater than that of said lower end of said tank.

7. The water heater of claim 6 wherein:
   said duct is vertically elongated, with said air inlet opening being adjacent said upper end of said tank, and has a lower end, adjacent said base, through which the interiors of said duct and said base communicate.

8. The water heater of claim 7 wherein:
   said base has an air outlet opening therein which is generally opposite from said lower end of said duct, with said evaporator being inwardly adjacent said outlet opening of said base, and said compressor being inwardly adjacent said lower end of said duct.

9. The water heater of claim 1 wherein:
   said fan is an evaporator fan disposed within said base.

10. The water heater of claim 1 wherein:
    said refrigerant expansion device is disposed within said base.

11. The water heater of claim 1 wherein:
    said evaporator is a vertically oriented panel type evaporator coil.

12. The water heater of claim 1 further comprising:
    a control system operative to selectively energize said secondary heating apparatus and/or said heat pump circuit.

13. A method of heating water comprising the steps of:
    providing a hollow base;
    positioning a tank atop said base, said tank having upper and lower ends;
    providing a heat pump circuit having refrigerant tubing in which a compressor, condenser, refrigerant expansion device and evaporator are connected in series;
    disposing said compressor and said evaporator in said base;
    placing said condenser in external, heat transfer contact with said tank;
    energizing said heat pump circuit to cause said compressor to sequentially flow refrigerant to said condenser, said refrigerant expansion device and said evaporator and then back to said compressor; and
    flowing air, via a path external to said tank, without surrounding or being surrounded by said tank, from an elevation substantially higher than that of said lower end of said tank sequentially into said base, across said compressor, across said evaporator, and then outwardly from said base into an external environment.

14. The method of claim 13 wherein:
    said condenser is a condenser coil, and said placing step is performed by coiling a length of said refrigerant tubing externally around said tank to form said condenser coil.

15. The method of claim 14 wherein:
    said placing step is performed by coiling a length of said refrigerant tubing externally around only a lower portion of said tank to form said condenser coil.

16. The method of claim 13 wherein:
    said flowing air step includes positioning a vertically elongated duct adjacent a vertical side portion of said tank and flowing the air downwardly through an upper end portion of the duct into said base.

* * * * *